(12) United States Patent
Büttner et al.

(10) Patent No.: US 12,278,527 B2
(45) Date of Patent: Apr. 15, 2025

(54) CAGE ROTOR AND METHOD FOR THE PRODUCTION THEREOF

(71) Applicant: Innomotics GmbH, Nuremberg (DE)

(72) Inventors: Klaus Büttner, Hollstadt (DE); Klaus Kirchner, Ostheim (DE); Matthias Warmuth, Windshausen (DE)

(73) Assignee: Innomotics GmbH, Nümberg (DE)

( * ) Notice: Subject to any disclaimer, the term of this patent is extended or adjusted under 35 U.S.C. 154(b) by 371 days.

(21) Appl. No.: 17/785,325

(22) PCT Filed: Sep. 25, 2020

(86) PCT No.: PCT/EP2020/076857
§ 371 (c)(1),
(2) Date: Jun. 14, 2022

(87) PCT Pub. No.: WO2021/121696
PCT Pub. Date: Jun. 24, 2021

(65) Prior Publication Data
US 2023/0026832 A1    Jan. 26, 2023

(30) Foreign Application Priority Data
Dec. 17, 2019 (EP) ..................................... 19216966

(51) Int. Cl.
*H02K 15/00* (2006.01)
*H02K 17/20* (2006.01)

(52) U.S. Cl.
CPC ......... *H02K 15/0012* (2013.01); *H02K 17/20* (2013.01)

(58) Field of Classification Search
None
See application file for complete search history.

(56) References Cited

U.S. PATENT DOCUMENTS 4,249,098 A * 2/1981 Karlen ............... H02K 15/0012
310/183
6,092,277 A * 7/2000 Beltowski .......... H02K 15/0012
29/598

(Continued)

FOREIGN PATENT DOCUMENTS

CN    204886451 U    12/2015
EP    2 660 967 A2    11/2013
(Continued)

OTHER PUBLICATIONS

WO 2016117003 A1 Machine Translation (Year: 2016).*
(Continued)

*Primary Examiner* — Tran N Nguyen
*Assistant Examiner* — Masoud Vaziri
(74) *Attorney, Agent, or Firm* — Henry M. Feiereisen LLC (57) ABSTRACT

A conductor bar of a cage rotor of an asynchronous machine has a longitudinal extension and includes first and second sections in the longitudinal extension. The first section has a hardness which is lower than a hardness of the second section and is realized through soft annealing, brief inductive heating or heating by a flame so as to enable a compression of the first section of the conductor bar by way of axial pressure after axially joining the conductor bar in a slot of a magnetically conductive body of the cage rotor, with the first section abutting an inner wall of the slot of magnetically conductive body of the cage rotor.

14 Claims, 6 Drawing Sheets

(56) References Cited

U.S. PATENT DOCUMENTS

| | | | |
|---|---|---|---|
| 10,491,062 B2 * | 11/2019 | Groschup | H02K 7/003 |
| 2008/0272667 A1 * | 11/2008 | Ionel | H02K 21/46 |
| | | | 310/156.83 |
| 2010/0013350 A1 * | 1/2010 | Fu | H02K 1/28 |
| | | | 310/216.001 |
| 2013/0043761 A1 * | 2/2013 | Kaimori | H02K 1/28 |
| | | | 310/216.123 |
| 2013/0291372 A1 | 11/2013 | Meyer et al. | |
| 2013/0293057 A1 * | 11/2013 | Naito | H02K 1/28 |
| | | | 310/216.123 |
| 2015/0349616 A1 * | 12/2015 | B?Ttner | H02K 15/0012 |
| | | | 29/598 |
| 2017/0229932 A1 * | 8/2017 | Simons | H02K 1/22 |
| 2020/0083786 A1 * | 3/2020 | B?ttner | H02K 15/0012 |
| 2021/0135524 A1 * | 5/2021 | Porcher | H02K 1/28 |

FOREIGN PATENT DOCUMENTS

| | | | | |
|---|---|---|---|---|
| JP | S58121150 U | 8/1983 | | |
| WO | WO-2016117003 A1 * | 7/2016 | | H02K 1/265 |

OTHER PUBLICATIONS

PCT International Search Report and Written Opinion of International Searching Authority mailed Jan. 19, 2021 corresponding to PCT International Application No. PCT/EP2020/076857 filed Sep. 25, 2020.

* cited by examiner

CAGE ROTOR AND METHOD FOR THE PRODUCTION THEREOF

CROSS-REFERENCES TO RELATED APPLICATIONS

This application is the U.S. National Stage of International Application No. PCT/EP2020/076857, filed Sep. 25, 2020, which designated the United States and has been published as International Publication No. WO 2021/121696 A1 and which claims the priority of European Patent Application, Serial No. 19216966.2, filed Dec. 17, 2019, pursuant to 35 U.S.C. 119 (a)-(d).

BACKGROUND OF THE INVENTION

The invention relates to a conductor bar, a cage rotor of an asynchronous machine, a method for the production of a cage rotor of asynchronous machines and to the use of asynchronous machines of this kind.

Cage rotors of asynchronous machines are fitted with a cage made of aluminum and/or copper. In order to obtain increased efficiency of the asynchronous machine, copper in particular is used. Copper bars are axially inserted into slots of a magnetically conductive body, and these are provided at the two end faces of a magnetically conductive body with a short-circuit ring. In order to then avoid oscillation of these conductor bars in the slots, these conductor bars are inserted or driven into slots of the cage rotor with a very narrow fit size tolerance with a great deal of effort, and this results inter glia in high manufacturing times of a cage rotor of this kind.

Due to the narrow fit size tolerance of the conductor bars increased effort is required in order to insert the conductor bars. The conductor bars are conventionally axially driven in, and this results in a comparatively high manufacturing time of a cage rotor. In this case, each individual conductor bar has to be driven into its respective slot. In addition, there is the risk of the conductor bars scraping on the slot wall of the individual sheets and metal chips thus forming which can subsequently block, or at least impair, operation during operation of the asynchronous machine.

As an alternative, the conductor bars are designed with a slight clearance fit so the conductor bars can be easily inserted without effort. In order to secure the bars in the slots the laminated core is accordingly saturated in a thin casting resin. The existing gaps between conductor bar and inner wall of the rotor slot are filled with resin thereby. One drawback of this is that the resin adheres to the side wags of the slots and sometimes detaches and can thus also impair operation of the asynchronous machine.

The conductor bars have thus previously been fixed in the rotor slot more or less reliably with quite a lot of effort. Oscillations inter alia of the conductor bars and therewith an impairment of the operation of an asynchronous machine are not ruled out thereby.

It is likewise known that due to axial rolling on the external diameter of the laminated core, a slight deformation of the laminated core hi the region of the slots results in settling of the conductor bar in the slot. This expenditure is similarly very high, however. In addition, the sheets at the outer region were plastically deformed hi the process. The strength of the rotor laminated sheet and its suitability for a comparatively high rotational speed is adversely affected thereby.

In hybrid technology, in which, for example, a copper bar is combined with aluminum die casting, the copper bar fills the rotor slot only in certain sections. The remainder of the slot is filled with aluminum by way of die casting, so the conductor bar is fixed in the slot. One drawback of this is that the slot is accordingly not completely filled with copper, which has a very high electric conductance value. The efficiency category of an asynchronous machine that is being sought cannot be attained, therefore.

SUMMARY OF THE INVENTION

Starting from this, the object of the invention is based on providing a cage rotor of an asynchronous machine, which easily prevents oscillation of the conductor bars during operation of the asynchronous machine across a high rotational speed range of the asynchronous machine and simultaneously has a comparatively high copper fill factor. In the process, the production of the cage rotor should be simple and suitable for automated manufacture. Furthermore, the asynchronous machine should be suitable for many different applications which demand high rotational speeds and/or high torque and/or change in load.

The object set is achieved by a conductor bar of a cage rotor of an asynchronous machine, which at specified sections in its longitudinal extension has a lower hardness, in particular is soft-annealed.

The object set is also achieved by a method for the production of a cage rotor of an asynchronous machine by way of the following steps:— providing a magnetically conductive body, in particular a laminated core with substantially axially running slots arranged on the radially outer edge, inventive conductor bars are axially inserted into the slots and, in respect of the cross-section of the respective slot, have a clearance fit and an axial protrusion of the conductor bars from the end faces of the magnetically conductive body, axial compression of the conductor bars inside the respective slot, so abutment points defined in the axial course of the slot are formed between the conductor bar and the inside of the slot, simultaneous or subsequent contacting of short-circuit rings at the axial protrusions of the conductor bars.

The solution to the object set is also achieved by a cage rotor of an asynchronous machine produced in accordance with the inventive method, wherein the conductor bars have abutment points defined in the slot in order to optimize the oscillating behavior of the cage rotor during operation.

The solution to the object set is also achieved by an asynchronous machine with an inventive cage rotor, wherein the asynchronous machine has a reduced oscillation behavior.

The solution to the object set is also achieved by use of at least one inventive asynchronous machine with an inventive cage rotor in drive systems for example of machine tools, in the foodstuffs industry, in traffic systems, in the chemical industry.

An inventive conductor bar, in particular copper bar, thus has in its axial extension one or more section(s) in which it is comparatively soft. This can take place, for example, by way of brief inductive heating or healing by way of a flame or other method at this location of the conductor bar. Advantageously, these methods can be used as early as during bar production of when cutting the conductor bare to length. This brief heating can also take place only after the conductor bar has been cut to length at the predetermined sections/locations.

Only brief heating above the recrystallization temperature is required in each case. With conductor bars made from copper, this is, for example, 750° C.

At predeterminable locations along its axial extension the conductor bar is provided with sections with a lower hardness thereby.

In the production method with conductor bars which have soft-annealed sections, a compression of the respective conductor bars can accordingly be achieved in these softer sections, after axially joining the conductor bars in the magnetically conductive body, by way of an axial pressure on the end face of the conductor bars. Since these softer sections are located inside the slot of the cage rotor, defined abutment points of the conductor bar form on the inside of the slot. Oscillation of the conductor bar or the conductor bars during operation of the asynchronous machine is prevented thereby.

The previous comparatively low fitting tolerance of the conductor bar in the slot is filled, at least in certain sections, due to this deformation. Oscillations of the bars during operation of the asynchronous machine are accordingly prevented due to the abutment of the conductor bar on the inner wall of the slot Due to the compression, the conductor bar preferably abuts the inner wall of the slot where the clearance fit between conductor bar and inner wall prevails and the softer section of the conductor bar is present.

Depending on the frequencies of the oscillation to be achieved, one or more of these section(s) can be integrated or introduced in(to) the conductor bar in its axial extension.

Without such a compression what is known as the basic oscillation f1 of the conductor bar is produced. With one compression the first harmonic oscillation 2*f1 is produced, with two oscillations per conductor bar, 3*f1 and so forth. Depending on the axial length of the magnetically conductive body, one or more compression(s) per length of the conductor bar is provided in order to prevent oscillation of the conductor bar in respect of its inherent frequency due to the additionally established oscillation node(s). Due to one or more additional node(s), in other words abutment points on the inner wall of the slot, the inherent frequency of the conductor bar is higher by twice or a multiple of the basic frequency and is thus outside of the exciting frequency during operation of the asynchronous machine.

BRIEF DESCRIPTION OF THE DRAWING

The invention and further advantageous embodiments of the invention will be explained in more detail with reference to schematically illustrated exemplary embodiments. In the drawings.

DETAILED DESCRIPTION OF PREFERRED EMBODIMENTS

Figure 1:
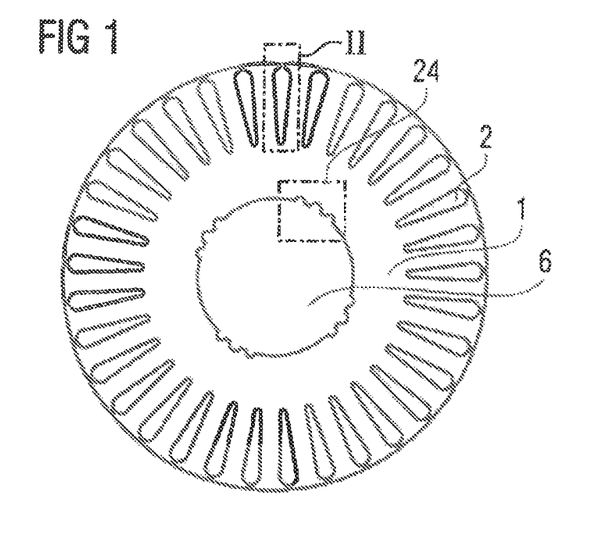
FIG. 1 shows a cross-section of a magnetically conductive body.

FIG. 1 shows a cross-section of a magnetically conductive body 1, in particular of a laminated core with substantially axially running slots 2 located on the radially outer edge and which in this exemplary embodiment are illustrated partially open. The partial opening relates to a small slot opening 3, which points to an air gap 4 (not shown) of an asynchronous machine 5. Furthermore, a shaft bore 6 is shown into which subsequently a shaft 7 is non-rotatably connected to the laminated core of the cage rotor 8.

A predeterminable number of slot arrangements 24 and/or ones which can be predetermined in shape is arranged on the inside, in other words the shaft bore 6 of the magnetically conductive body 1, in particular of the laminated core of the cage rotor 8. These will be described in more detail in due course, in particular from FIG. 7.

Figure 2:
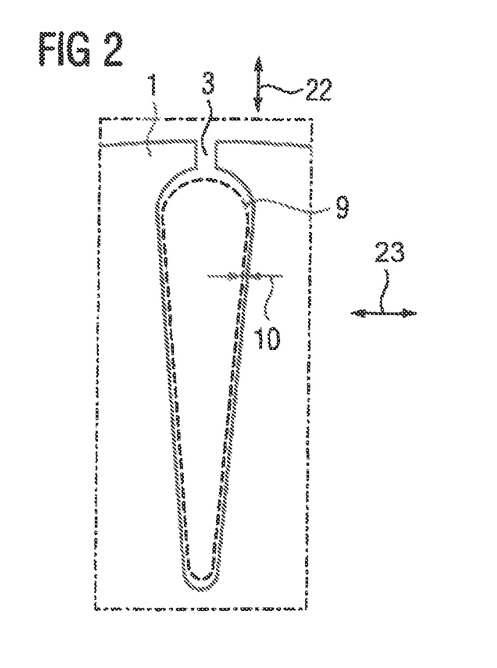
FIG. 2 shows a detail of FIG. 1.

FIG. 2 shows a detailed illustration of a slot 2 with a conductor bar 9 located in this slot 2 and which, in respect of the cross-section of the slot 2, viewed in the circumferential direction 23, has a circumferential clearance fit 10, at least in certain sections, in such a way that the conductor bar 9 can be axially inserted into the slot 2 almost without force and there is no chip removal on the inner walls of the slot 2 in the process.

The definition of the ISO fit system forms the basis of the clearance fit 10. Accordingly, the conductor bar 9 may be moved or shifted slightly inside the slot 2, even by hand. It is decisive that abutment regions 21 are produced between inner wall of the slot 2 and the conductor bars 9 as a result of the compression of the conductor bars 9 at the predetermined sections 12.

Figure 3:
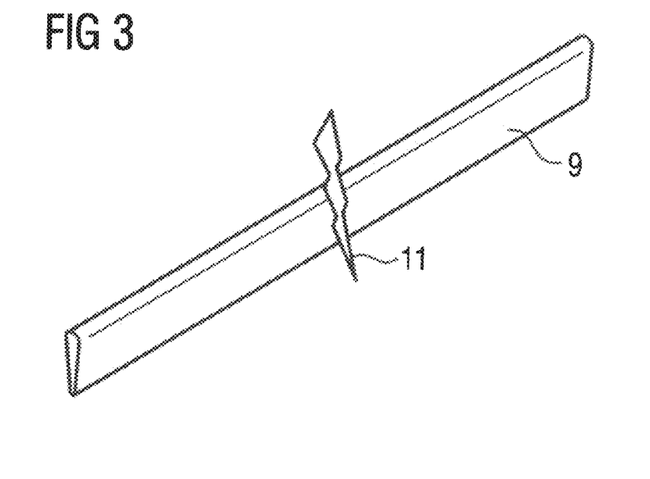
FIG. 3 shows a conductor bar.
Figure 4:
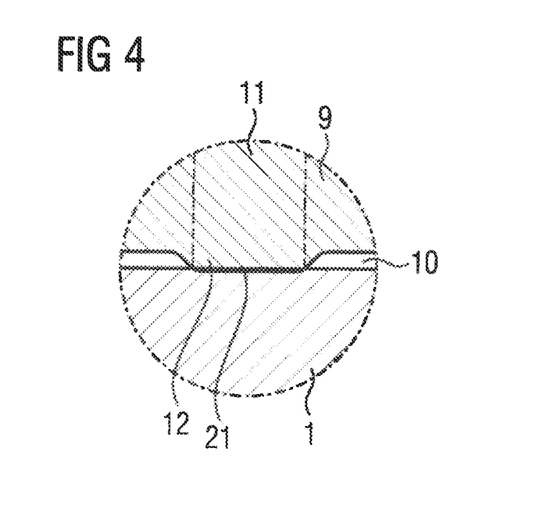
FIG. 4 shows a detailed illustration of a conductor bar in the slot.
Figure 5:
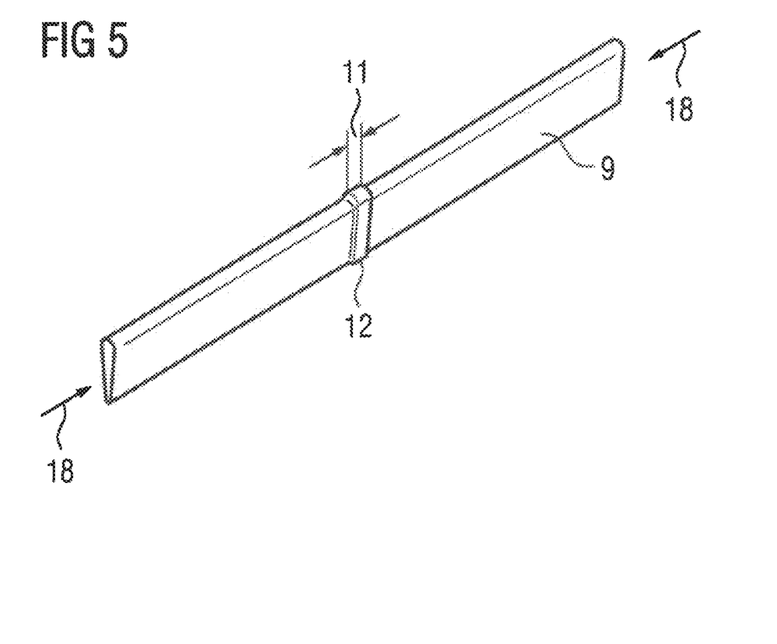
FIG. 5 shows a conductor bar, which has been compressed.

A conductor bar 9 of this kind was soft-annealed at predetermined axial sections 11 of the conductor bar 9 located in the longitudinal extension, so a comparatively low hardness is established there. As a result of this low hardness, as schematically shown in FIG. 5, the conductor bar 9 can then be compressed by axially external forces 18 so a thickened portion of the conductor bar 9 is established in this region. This thickened portion 12 produces the wedging and bracing of the conductor bar 9 in the slot 2 shown in a detailed illustration in FIG. 4.

The thickened portion 12 of the conductor bar 9 can be fully formed on an axial section 11, It is also possible, however, that a thickened portion 12 occurs on an axial section 11 only in individual directions, in the radial direction 22 and/or circumferential direction in other words. It is decisive that defined abutment regions 21 form between conductor bar 9 and inner wall of the slot 2 (see also FIG. 2).

The invention may be used for a wide variety of different slot shapes or conductor bar cross-sections such as a round bar, wedge bar, L-bar, deep bar, drop-shaped bar/slot, and the combinations thereof in double cage rotors.

The conductor bars 9 can also be axially compressed by placing the short-circuit rings 13 onto the axial protrusions 20 of the conductor bars 9 projecting out of the laminated core 1. Two steps—compression and electrical contacting of the conductor bars 9 with the short-circuit ring 13—are possible in one process thereby.

A wide variety of different possibilities are provided in the case of electrical contacting of conductor bars 9 with the short-circuit ring 13. This can take place by way of mechanical pressing, soldering procedures, inductive or electrical heating or combinations thereof.

Oscillations of the conductor bars 9 during operation of an asynchronous machine 5 can be prevented by this inventive wedging/bracing of the conductor bars 9 at predeterminable sections in the respective slot 2.

Figure 6:
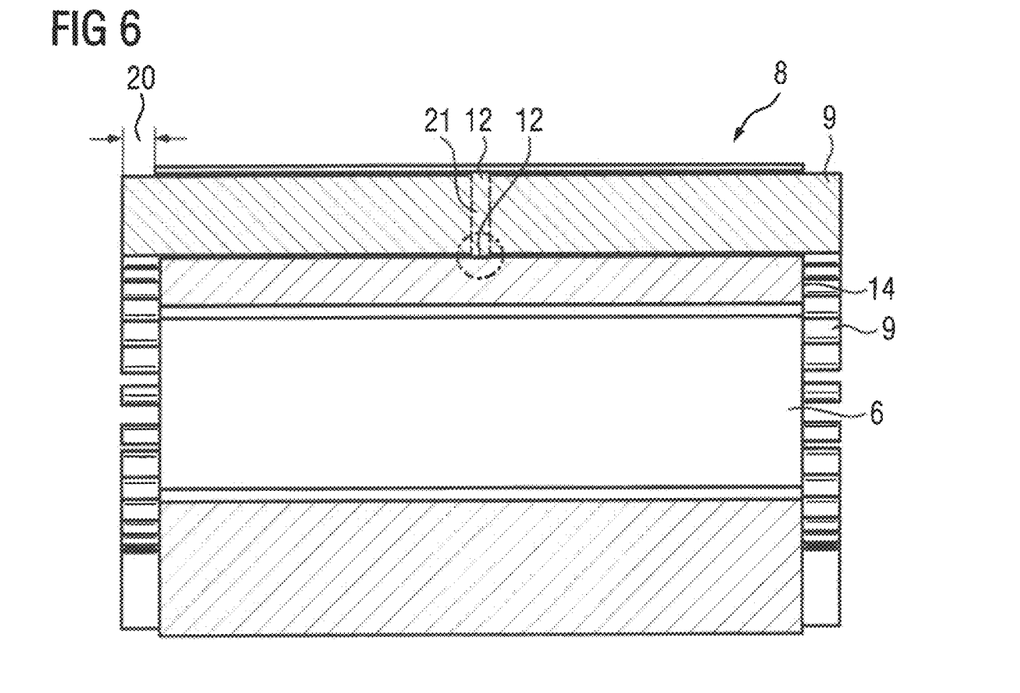
FIG. 6 shows a schematic illustration of a conductor bar in the magnetically conductive body.

FIG. 6 shows a cage rotor 8 without short-circuit rings 13, with axial protrusions 20 of the conductor bars 9 on the end faces 14 of the laminated core 1. In this case the conductor bars 9 have a thickened portion 12 inside the axial course in the slot 2 owing to a compression, Abutment regions 21 between the inner wall of the slot 2 and the conductor bar 9 are created thereby. The short-circuit ring 13 is put on and electrically contacted in a subsequent step.

Figure 7:
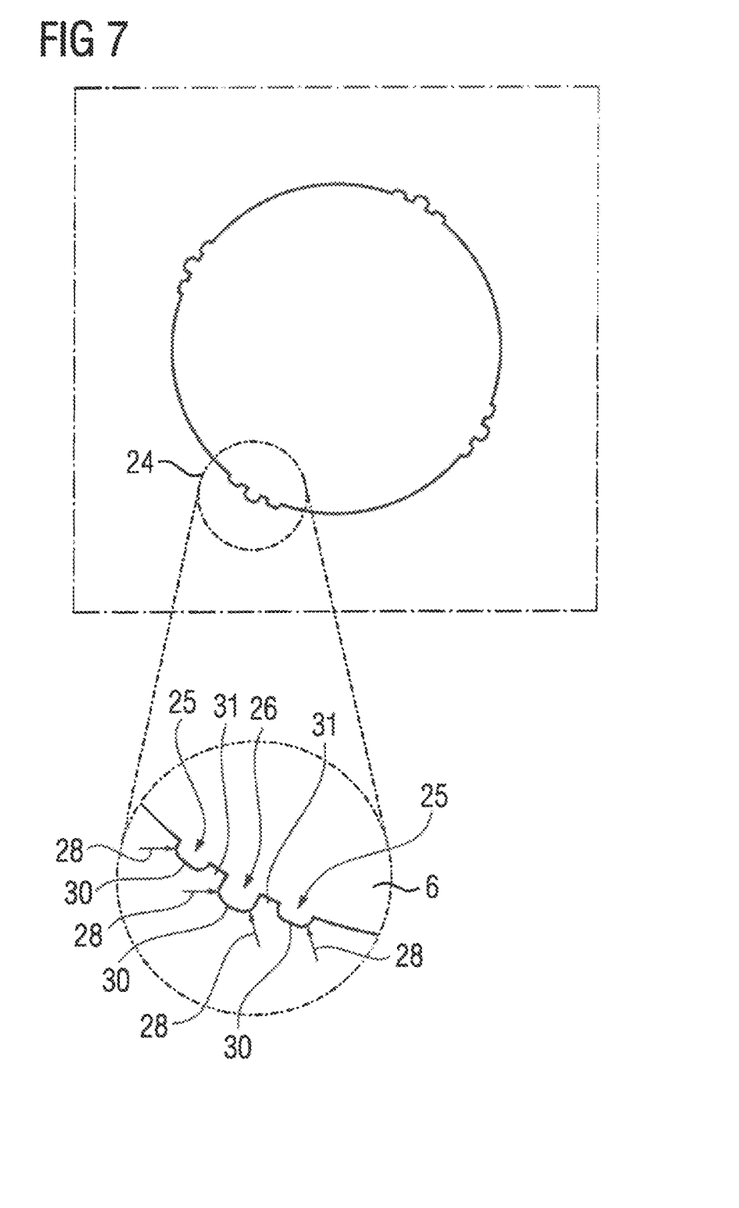
FIG. 7 shows a detailed view of a slot arrangement.

FIG. 7 shows a detailed view of a slot arrangement 24 on the shaft bore, which in this design has a threaded slot 26 and two flanking relief slots 25. This threaded slot 26 thus has substantially a rectangular contour whose corners are provided with radii 28. There is thus no semi-circular slot present. Instead there are at least two smaller radii of this contour. Two smaller radii are in the corners and a larger radius is in a segment 30 connecting them.

These threaded slots 26 serve inter alia also to align individual sheets in the case of a packaging of the laminated core of the cage rotor 8, in order to guarantee, even at comparatively high rotational speeds of an asynchronous motor, the centrifugal force effects of the cage rotor 8 with sufficient torque transmission from the laminated core of the cage rotor 8 to the shaft 7, which demand a high oversize in the laminated core fit on the shaft 7, the threaded slots 26 should be supplemented with relief slots 25. With only threaded slots 26 alone there is a risk of mechanical overloading of these sheets in this region.

Figure 8:
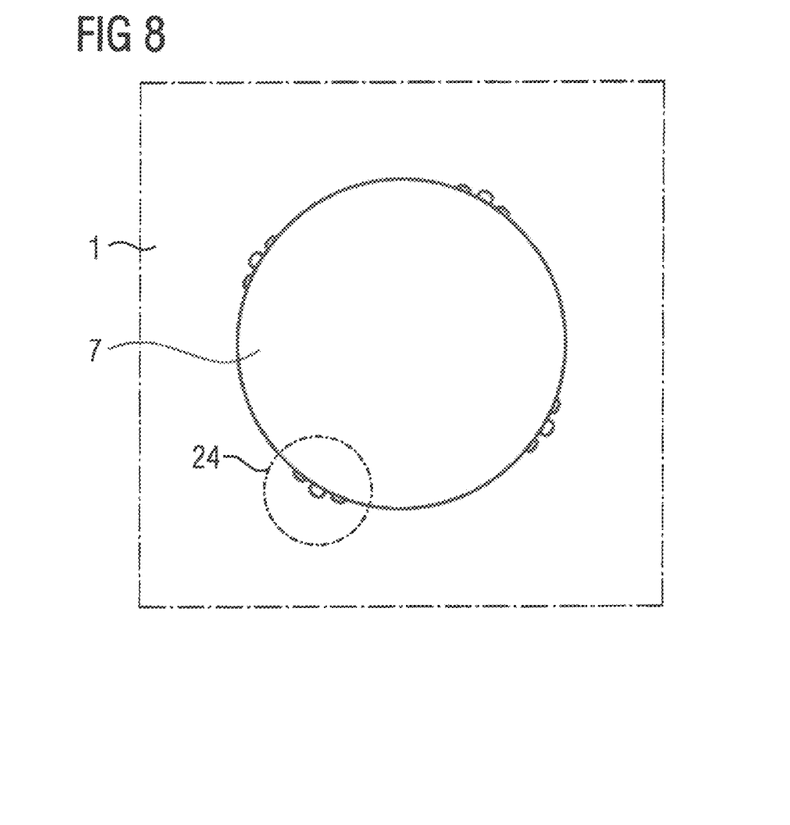
FIG. 8 shows slot arrangements with shaft.

FIG. 8 shows the shaft bore 6 with its slot arrangements 24, into which shaft bore 6 the shaft 7 is inserted.

Figure 9:
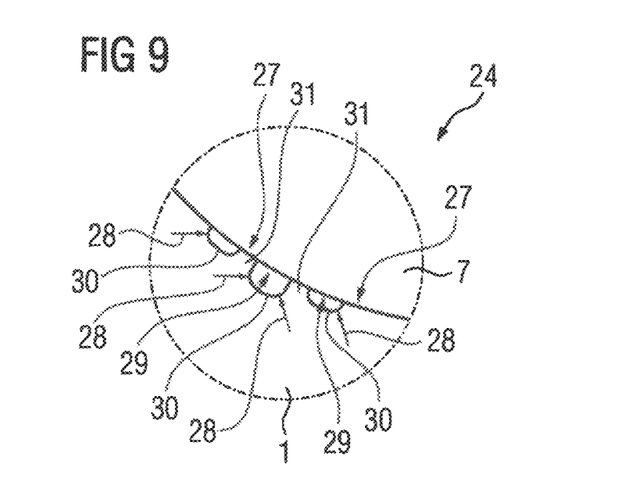
FIG. 9 shows a detailed view of a slot arrangement with shaft.

FIG. 9 shows hi a detailed illustration a slot arrangement 24 with the shaft 7. The slot arrangement 24 is designed as in FIG. 7. Positive fit regions 29 and contact regions 27 are present. In the case of axial joining of the shaft 7 into the shaft bore 7, the webs 31, in other words in the intermediate pieces between the threaded slot 26 and the relief slots 25, result in a smoothing of waves or gouges or flutes, which are formed due to the production of the shaft 7, Positive fit regions 29 in the region of the threaded slots 26 and relief slots 25 are created thereby. These positive fit regions 29 also provide security against the shaft 7 sapping through inside the laminated core 1 and thus ensure improved torque transmission behavior.

Mechanical stresses of the sheet, in particular with a large oversize in the laminated sheet packet fit, on the shaft 7, are greatly reduced due to the slot arrangements 24, in other words the combinations of threaded slots 26 with relief slots 25.

Advantageously, the slot arrangement 24 on the shaft bore 6 are uniformly distributed in order to obtain an adequate distribution of the torque to be transmitted.

The contour of the threaded slot 26 and/or the relief slots 25 has, at least in certain sections, an arcuate or elliptical arch-shaped contour, therefore, Mechanical stresses in this region reduce thereby, in particular if there is a very excessive oversize of laminated core 1 and shaft 7, in order to guarantee the requisite centrifugal force stresses and high torque transmission behavior.

The slots 2 serve to receive the conductor bars 9. These conductor bars 9 in the slot 2 form a torque due to electromagnetic interaction with a winding system 16 of a stator 19. Threaded slots 26 and relief slots 25, which do not contribute to torque formation but merely contribute to the torque transmission to the shaft 7, are in the slot arrangement 24.

Figure 10:
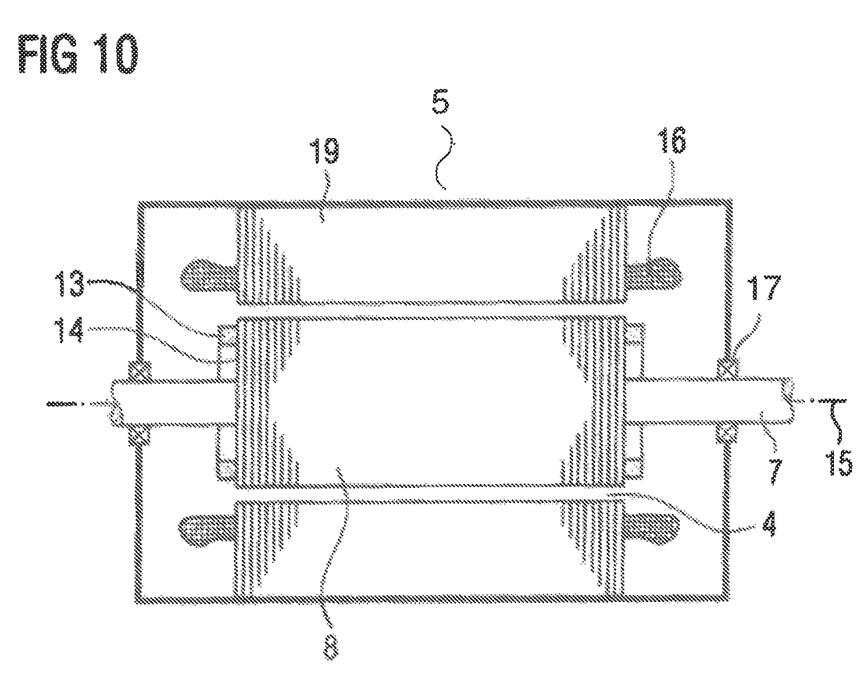
FIG. 10 shows a longitudinal section of an asynchronous machine.

FIG. 10 shows in a schematic longitudinal section an asynchronous machine 5 with an inventive cage rotor 8. The shaft 7 is rotated about an axis 15 due to electromagnetic interaction of a winding system 16 in the stator 19 with the cage rotor 8. The shaft 7 is supported in bearings 17 and non-rotatably connected to the laminated core 1 of the cage rotor 8.

In this embodiment, the cage rotor 8 exhibits short-circuit rings 13, which abut the end face 14 of the laminated core 1. The inventive idea may of course also be implemented with short-circuit rings 13 spaced apart from the end face 14.

The inventive idea may also be used for rotors, which have permanent magnets and a short-circuit cage in the rotor.

Asynchronous machines 5 of this kind may be used in the low and high voltage ranges. Areas of application are drive systems in the industrial sector as well as in vehicle drive systems. It is advantageous in this case that, even in the case of high rotational speeds and/or high torques of the asynchronous machines 5, conductor bar oscillations do not become adversely noticeable in the respective use. For example, a high surface quality of workpieces, which were produced by machine tools with inventive asynchronous machines, can thus still be guaranteed.

What is claimed is:

1. A conductor bar of a cage rotor of an asynchronous machine, said conductor bar having a longitudinal extension and comprising first and second sections in the longitudinal extension, with the first section having a hardness which is lower than a hardness of the second section and realized through soft annealing, brief inductive heating or heating by a flame so as to enable a compression of the first section of the conductor bar by way of axial pressure after axially joining the conductor bar in a slot of a magnetically conductive body of the cage rotor, with the first section abutting an inner wall of the slot of magnetically conductive body of the cage rotor.

2. A method for producing a cage rotor of an asynchronous machine, said method comprising:
   providing a magnetically conductive body with substantially axially running slots arranged on a radially outer edge;
   producing conductor bars such as to include first and second sections in a longitudinal extension, with the first section having a hardness which is lower than a hardness of the second section and realized through soft annealing, brief inductive heating or heating by a flame;
   axially Inserting the conductor bars into the slots of the magnetically conductive body with a clearance fit and with an axial protrusion of each of the conductor bars projecting from an end face of the magnetically conductive body;
   subjecting the conductor bars to an axial pressure to compress the conductor bars inside the slots and to axially join the conductor bars in the slots of the magnetically conductive body such that the first section of the conductor bars abuts at a defined abutment region an inner wall of the slots; and
   simultaneous or subsequent contacting of short-circuit rings at the axial protrusions of the conductor bars.

3. The method of claim 2, wherein the magnetically conductive body is a laminated core.

4. A cage rotor of an asynchronous machine, said cage rotor comprising:

a magnetically conductive body including substantially axially running slots arranged on a radially outer edge of the magnetically conductive body; and conductor bars received in the slots of the magnetically conductive body, each said conductor bar having a longitudinal extension and comprising first and second sections in the longitudinal extension, with the first section having a hardness which is lower than a hardness of the second section and realized through soft annealing, brief inductive heating or heating by a flame so as to enable a compression of the first section of the conductor bar by way of axial pressure after axially joining the conductor bar in the slot of the magnetically conductive body and formation of a defined abutment region in the slot to optimize an oscillation behavior of the cage rotor during operation of the asynchronous machine, with the first section abutting an inner wall of the slot of the magnetically conductive body at the abutment region.

5. The cage rotor of claim 4, wherein the magnetically conductive body is a laminated core.

6. The cage rotor of claim 4, further comprising a short-circuit ring directly abutting an end face of the magnetically conductive body.

7. The cage rotor of claim 4, further comprising a short-circuit ring arranged in spaced-apart relation to an end face of the magnetically conductive body.

8. The cage rotor of claim 4, wherein the abutment region, established as a result of the compression of the first section, forms a thickened portion of the first section about an entire circumference or only in individual directions.

9. The cage rotor of claim 4, further comprising a short-circuit cage and permanent magnets.

10. An asynchronous machine, comprising:

a cage rotor comprising a magnetically conductive body including a shaft bore, substantially axially running slots arranged on an radially outer edge of the magnetically conductive body, and conductor bars received in the slots of the magnetically conductive body, each said conductor bar having a longitudinal extension and comprising first and second sections in the longitudinal extension, with the first section having a hardness which is lower than a hardness of the second section and realized through soft annealing, brief inductive heating or heating by a flame so as to enable a compression of the first section of the conductor bar by way of axial pressure after axially joining the conductor bar in the slot of the magnetically conductive body and formation of a defined abutment region in the slot to optimize an oscillation behavior of the cage rotor during operation of the asynchronous machine, with the first section abutting an Inner wall of the slot of the magnetically conductive body at the abutment region, wherein the cage rotor comprises at the shaft bore a slot arrangement which includes a threaded slot and two flanking relief slots.

11. The asynchronous machine of claim 10, constructed for use in a drive system, machine tool, foodstuffs industry, traffic system, or chemical industry.

12. The conductor bar of claim 1, wherein the first section of the conductor bar abuts at a defined abutment region the inner wall of the slot and the abutment region, established as a result of the compression of the first section, forms a thickened portion of the first section about an entire circumference or only in individual directions.

13. The method of claim 2, wherein the abutment region, established as a result of the compression of the first section, forms a thickened portion of the first section about an entire circumference or only in individual directions.

14. The asynchronous machine of claim 10, wherein the abutment region, established as a result of the compression of the first section, forms a thickened portion of the first section about an entire circumference or only in individual directions.

* * * * *